US010171495B1

(12) United States Patent
Bowen (10) Patent No.: US 10,171,495 B1
(45) Date of Patent: Jan. 1, 2019

(54) DETECTION OF MODIFIED REQUESTS

(71) Applicant: Amazon Technologies, Inc., Reno, NV (US)

(72) Inventor: Peter Zachary Bowen, Bainbridge Island, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 197 days.

(21) Appl. No.: 15/178,385

(22) Filed: Jun. 9, 2016

(51) Int. Cl.
| | |
|---|---|
| *H04L 29/06* | (2006.01) |
| *H04L 29/08* | (2006.01) |
| *H04L 12/26* | (2006.01) |
| *G06N 99/00* | (2010.01) |
| *G06N 7/00* | (2006.01) |

(52) U.S. Cl.
CPC ......... *H04L 63/1466* (2013.01); *G06N 7/005* (2013.01); *G06N 99/005* (2013.01); *H04L 43/04* (2013.01); *H04L 63/10* (2013.01); *H04L 63/1425* (2013.01); *H04L 63/16* (2013.01); *H04L 67/02* (2013.01); *H04L 67/10* (2013.01); *H04L 67/42* (2013.01)

(58) Field of Classification Search
CPC .................................................. H04L 63/1466
USPC ............................................................ 726/23
See application file for complete search history.

(56) References Cited

U.S. PATENT DOCUMENTS

| | | | |
|---|---|---|---|
| 8,230,505 B1* | 7/2012 | Ahrens | G06Q 10/02 |
| | | | 705/5 |
| 2007/0121596 A1* | 5/2007 | Kurapati | H04L 29/06027 |
| | | | 370/356 |
| 2018/0054440 A1* | 2/2018 | Bercovich | H04L 63/101 |
| 2018/0054443 A1* | 2/2018 | Bercovich | H04L 63/101 |
| 2018/0054455 A1* | 2/2018 | Bercovich | H04L 63/101 |

OTHER PUBLICATIONS

Lee Brotherston, "Stealthier Attacks & Smarter Defending with TLS Fingerprinting," DerbyCon, Sep. 25, 2015, http://www.slideshare.net/LeeBrotherston/tls-fingerprinting-stealthier-attacking-smarter-defending-derbycon.

* cited by examiner

*Primary Examiner* — Jacob Lipman
(74) *Attorney, Agent, or Firm* — Hogan Lovells US, LLP (57) ABSTRACT

Suspicious connection requests can be detected by analyzing connection parameters at multiple levels of a network framework. For Internet-based requests, unexpected combinations and/or ordering of Layer 6 (TLS) and Layer 7 (HTTP) parameters, for example, can be indicative of suspicious activity with respect to the connection. The connection parameters for a request can be compared against a set of determined signatures and/or analyzed using a trained probability model to determine a probability that the connection is improper. A probability value can be calculated and compared against at least one probability threshold to determine whether the connection is suspicious enough to cause a specified action to occur. The signatures can be updated through an offline or dynamic online process, and the thresholds can vary among the various embodiments.

20 Claims, 6 Drawing Sheets

DETECTION OF MODIFIED REQUESTS

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider. In many instances, a customer device will establish a connection with a content server, for example, and send requests over that connection. It is possible, however, that an unintended third party can intercept this connection, and can then send and receive requests that appear to come from the intended parties to the connection. In many instances a customer can determine when such a "man in the middle" attack is occurring, due to the difference in expected server certificate or other such information, but it can be difficult for the server side as there generally is no customer certificate to use for verification.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of data in an electronic environment. In particular, various approaches provide for the detection of suspicious connections based at least in part upon analyzing the parameters of the connection at multiple levels of the relevant network framework (i.e., the Open System Interconnection (OSI) model). In one example, the combination and ordering of Layer 6 (TLS) and Layer 7 (HTTP) connection parameters can be analyzed to determine whether the parameters correspond to known and valid connection parameters. If the combination and/or ordering match a known invalid connection set, or deviate from a known valid set, that can be indicative of an improper or suspicious connection.

In some embodiments a probability model is trained and/or set of signatures generated that can be used to calculate a probability that a connection should be treated as suspicious. In some embodiments the parameters for a connection can be compared against known signatures to attempt to find a matching signature and associated probability score. In other embodiments the parameters can be analyzed in real time using a probability model that is updated dynamically with newly received parameter data. One or more probability thresholds can be specified, which can vary depending on various factors, and a probability score meeting or exceeding any of those thresholds can trigger an appropriate action to be taken for the potentially suspicious connection. In some cases a connection might be denied or dropped, while in other cases the connection might receive limited access or have data logged for investigation, among other potential actions. Requests can also be routed differently based at least in part upon the determined probability score.

Various other such functions can be used as well within the scope of the various embodiments as would be apparent to one of ordinary skill in the art in light of the teachings and suggestions contained herein.

Figure 1:
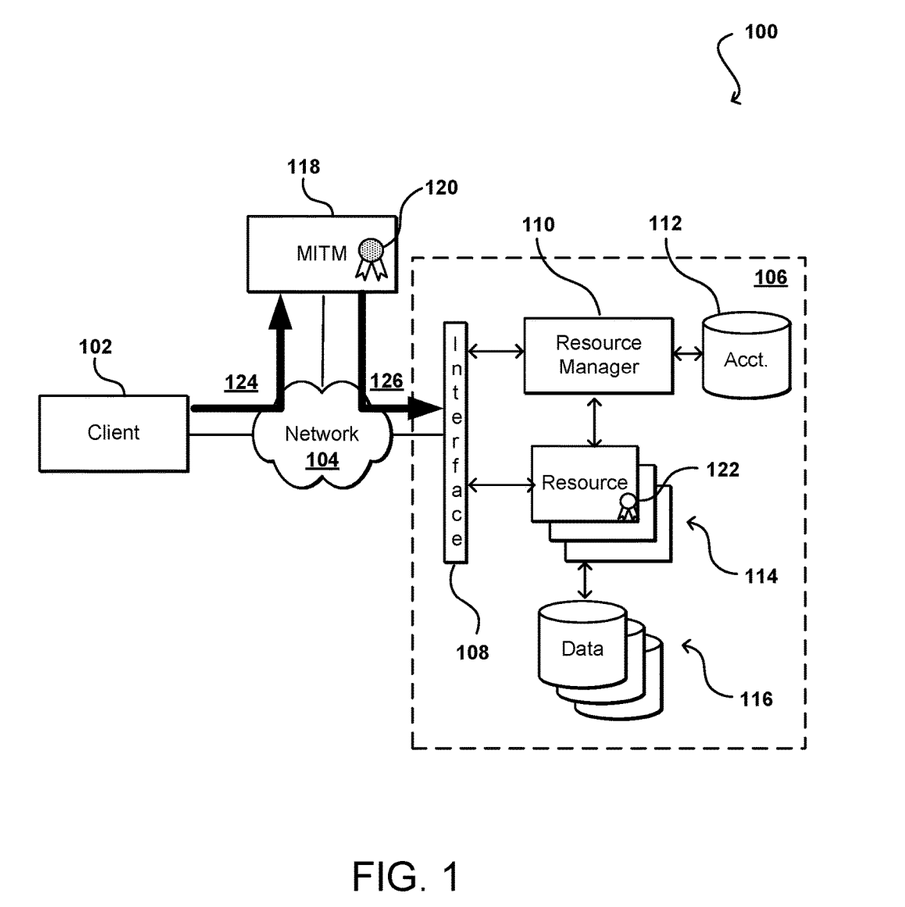
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, wearable computers (smart glasses, watches, and contacts) and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In many instances, a communication connection can be established between the client device 102 and the resource provider environment 106 across the at least one network 104. In at least some embodiments, this can include establishing a connection using a handshake, such as a transmission control protocol (TCP) three-way handshake for Internet-based communications. As part of the handshake, a set of parameters from a connection request from the client device 102 will be analyzed and parameters for the connection negotiated and/or approved. The agreed-upon parameters for the connection are then dynamically set after the communication channel is established but before the transfer of actual communication packets begins. The parameters provided by the client can indicate communication types supported by the client device, such as may include specific cipher suites or communication protocols. For example, when a TLS connection is established, the handshake process will involve a client hello message and a server hello message, where the client sends a list of supported cipher suites in order of preference, and the server replies with the cipher suite that has been selected from that list. Using the provided parameters, the server (or other party to the connection) can also perform tasks such as to create the appropriate cryptographic keys and determine the appropriate permissions or applicable rules for the connection.

There can be various parameters set at various levels of the connection request. In one example, an Open System Interconnection (OSI) model implements protocols at seven layers of a vertical stack of a networking framework, and the parameters can be pulled from various combinations of these layers. The OSI model, consists of the physical layer (1), data link layer (2), network layer (3), transport layer (4), session layer (5), presentation layer (6), and application layer (7). For purposes of establishing and maintaining a connection, a server might make decisions based on, for example, parameters of network transport layer 4 (relating to SPX, TCP, or UDP, etc.), parameters of session layer 5 (relating to NFS, RPC, SQL, etc.), parameters of presentation layer 6 (relating to encryption, media formats, etc.) and application layer 7 (relating to HTTP, FTP, NFS, etc.).

Once a connection (e.g., a TLS connection) is established, a browser or other application executing on the client device 102 can communicate directly (across the at least one network 104) with a connected resource 114 of the resource provider environment 106. A potential problem can arise, however, when an unintended third party intercepts or otherwise gains access to the connection. As illustrated in the figure this entity is referred to herein as a man-in-the-middle (MITM) 118, or a system or component that is able to establish a first connection with the client device 102 and a second connection with the resource 122. From the perspective of both the client device 102 and the resource 114, there is a single connection between them over which data can be communicated. The client device and resource might be unaware, however, that the connection actually comprises two separate connections 124, 126 that are connected by the MITM 118. The MITM is able to allow data to flow back and forth between the client device 102 and the resource 122. The MITM can also perform other tasks, however, such as to modify transmitted data, and to send or prevent data packets from being transmitted, among other such actions.

It is possible to detect this unknown intermediary from the client device 102, or to at least determine a potential issue with the connection, based upon factors such as a server certificate. The client device 102 can expect a certain certificate 122 associated with the resource 114 or resource provider environment 106 to be associated with the connection and data received over that connection. If the client device 102 instead detects a second certificate 120 that is different from the expected certificate, then the client device (or software executing on the client device) can take an appropriate action. This can include, for example, dropping the connection, stopping the transmission of data over the connection, or notifying a user of a potential threat or invalid certificate, among other such options.

It is not similarly possible for the resource 114 to make such a determination, as there often is no such certificate or other verifiable credential available for a client device 102. The server would simply receive a connection request with appropriate parameters, at least some of which the MITM 118 can get from a client device request, and treat the connection 126 with the MITM 118 as a connection with the client 102.

In at least some instances, however, the selection and/or ordering of the parameters for a connection request from the MITM 118 will be different from those that would have been received from the client device 102. While various combinations of parameters at different levels may be technically valid according to the applicable specification(s), there will be a limited set of parameter combinations that are received from valid client devices and applications. For example, a first browser application (e.g., Firefox) might specify a certain set of parameters, and a second browser application (e.g., Chrome) might specify a different set of parameters. In at least some embodiments, different applications or application versions might also specify similar parameters but in different orders or in different ways. Various patterns or signatures can be determined that match the ways in which the various protocols are implemented for valid client devices and applications, and these patterns or signatures can be updated as new software and devices implement those protocols.

By analyzing the parameter combinations across various levels, and comparing those combinations to the known patterns, signatures, or other valid combinations, a MITM attack may be able to be detected through variation from these valid combinations. For example, a client device might be running a first browser and the MITM using a second browser implementation, which results in the parameter combination including part of the pattern for the first browser and part of the pattern for the second browser. Since neither of those browsers would utilize such a combination, the combination can be indicative of a MITM attack or other unauthorized modification or intrusion on the connection. Further, the modification might cause the ordering of parameters to be such that no known application would provide such ordering based on the fixed set of code paths. Unexpected additions and deletions can also be indicative of a MITM attack. Various other modifications or variations can be detected as well by analyzing the connection parameters across multiple layers.

It will often be the case, however, that a new application or device, or version of an application or device, will cause a new combination to be detected that is not known to be a valid combination. Further, there may be some variation among valid applications and devices, and the set of combinations of applications and devices can be quite large, such that it can be difficult to make an absolute decision in many cases as to whether there is a MITM attack based upon knowable parameters of the connection.

Accordingly, approaches in accordance with various embodiments can calculate probabilities of a MITM attack (or other unexpected occurrence) based at least in part upon the observed parameters for a connection. In some embodiments, this can include comparing combinations of the parameters across multiple levels against a set of known signatures (both valid and invalid) to attempt to locate a matching signature, and then use the probability score associated with that signature. If no matching signature is found, the similarities to various signatures can be used to calculate a probability based upon a weighted combination of the probabilities for those signatures. The results can be logged and used in an offline process to periodically (i.e., every evening) update the signatures and associated probability values. In other embodiments a more real-time approach can be used where the parameter combinations are evaluated using a trained probability model and a probability dynamically calculated, with the model then being updated with that information.

An appropriate action can then be taken based at least in part upon the probability value. Here, the probability will be discussed in terms of likelihood of an attack, with a 100% probability indicating that there is a MITM attack, but other approaches can be used as well, such as where 100% represents a connection that is determined to contain a completely expected and valid parameter combination, among other such options. In many cases, there will be at least one threshold specified that triggers a specific action. For example, any connection may be processed as a valid request if the probability of a MITM attack is determined to be less than 50%, 60%, or 75%, among other such options. A connection might be denied or dropped if the probability is determined to be above this threshold or a different threshold, such as a threshold of at least 80% or 90% probability of a MITM attack. As mentioned, however, different actions can be taken in different embodiments and for different applications or systems, etc. For example, the probability and parameter combination might be logged and used to later update the signature and model data without dropping the connection, with a notification for review sent or restriction on types of data transmitted in some situations. Various other actions can be taken as well within the scope of the various embodiments.

Figure 2:
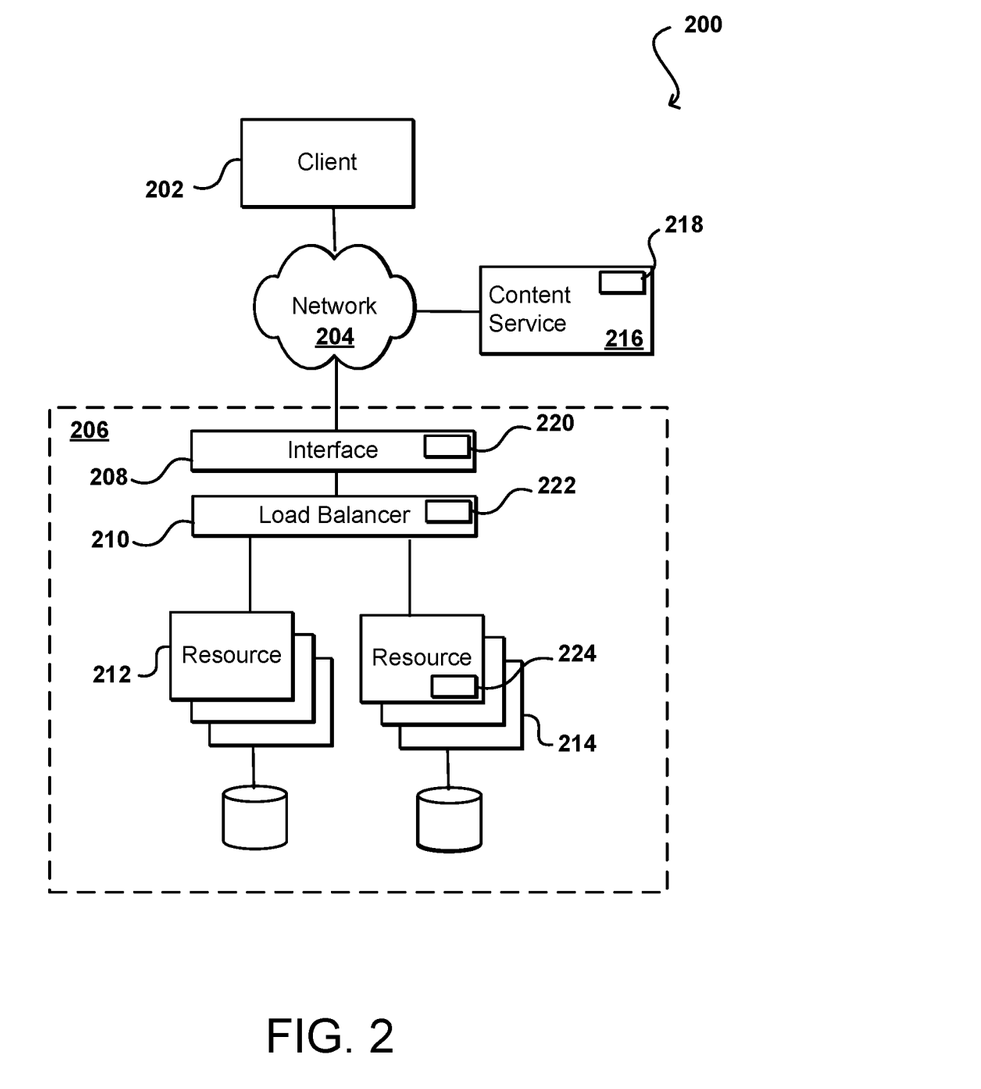
FIG. 2 illustrates an example environment in which connection parameters can be analyzed at various locations and with different criteria in accordance with various embodiments.

The analysis of connection parameters for purposes of MITM detection, among other such purposes discussed and suggested herein, can occur at various appropriate locations across a system or environment. As an example, FIG. 2 illustrates an environment 200 wherein a client device 202 can establish a connection with a resource provider environment 206 across at least one network 204. As known for requests such as HTTP requests for Web content, the request can be received to an interface layer 208, which can direct that to a load balancer 210 for purposes of determining a resource 212, 214 of the appropriate type with the capacity to process at least a portion of the request. In some embodiments the selected resource 212, 214 can be a Web server or other content server able to provide content such as Web page content, media content, and the like. In at least some instances the content can include links or calls to content from a third party content service 216, such as may supply advertising or other third party supplemental content, which can be incorporated into, or displayed along with, the primary content from the selected resource.

As discussed, however, a MITM component or system can "sit" on or between any of these systems, components, and environments and the client device 202. As an example, the MITM can be on the client device 202 in the form of malware, undetected within the resource provider environment 206, somewhere within (or connected via) the at least one network 204, or at another appropriate location. Accordingly, it can be desirable for various entities in the environment to place detection modules or components at various locations across the environment. For example, a resource provider might put a MITM detection module 220 at the interface layer 208 in order to attempt to prevent as many invalid connections from being established as possible, as well as to attempt to keep suspicious data packets out of the resource provider environment 206. It might be the case, however, that a provider might not need to protect against MITM connections for all requests or connections. For example, a request for a home page without advertising during a period of low user activity may not rise to the level where the provider wants to allocate the cost and resources to identifying potential invalid requests. In such cases, a detection module 222 might instead be placed at the load balancer level 210, such that only requests that are to be routed for a particular task or system will be analyzed. The ability to place the detection module 222 at the load balancer level also enables the request to be routed to different destinations based at least in part upon the determined probability score or other such determination. For example, instead of denying a suspicious connection request a load balancer can determine to route that request to a "safe" environment, such as to a resource with restricted access to data or resources, which can prevent unauthorized access to data or functionality within the resource provider environment.

A detection module can also be placed on a specific resource 214, or type of resource. This enables the cost of detection to be incurred only at those places deemed of importance, in at least some embodiments, and enables specific actions or analyses to be performed for different tasks or systems. At the resource level, a detection module can determine whether to allow or deny a connection or other request, and can take an action that is relevant for that resource. For example, for a website the action for a suspicious request might be to not deliver certain content. For an electronic marketplace, the action might be to prevent access to a customer account or limit purchases without some other verification or credential being supplied. For advertising where entities get compensated for driving customers to a particular location or address, for example, an action can be to prevent the advertising from being displayed, or to provide the advertising but not provide the compensation. Another action would be to place the compensation information in a location that can be later reviewed, such that suspicious activity related to a common source or with a common pattern can be prevented from compensation and potentially have revenue paths terminated.

Similar functionality can be implemented by a detection module 218 for a third party content service 216 or other such external system. Modules can be placed in other locations as well, such as part of a content distribution network, as part of a Web application firewall at a network edge, etc. It should also be mentioned that although the detection module is shown to be a module on the various resources or components, the modules can be on separate components at, or connected to, the same layers or subsystems, or can be implemented through standalone services, among other such options. In some embodiments, the detection module can be part of a third party service external to the environment. Such an approach can utilize certificates or credentials on both ends of the connection in order to prevent a MITM attack between the detection module and the relevant connection point. A detection module or component in at least some embodiments can be implemented at various locations for various layers, as long as both the TLS data and the underlying connection data (or other levels of parameters) are visible or otherwise available for analysis.

Figure 3:
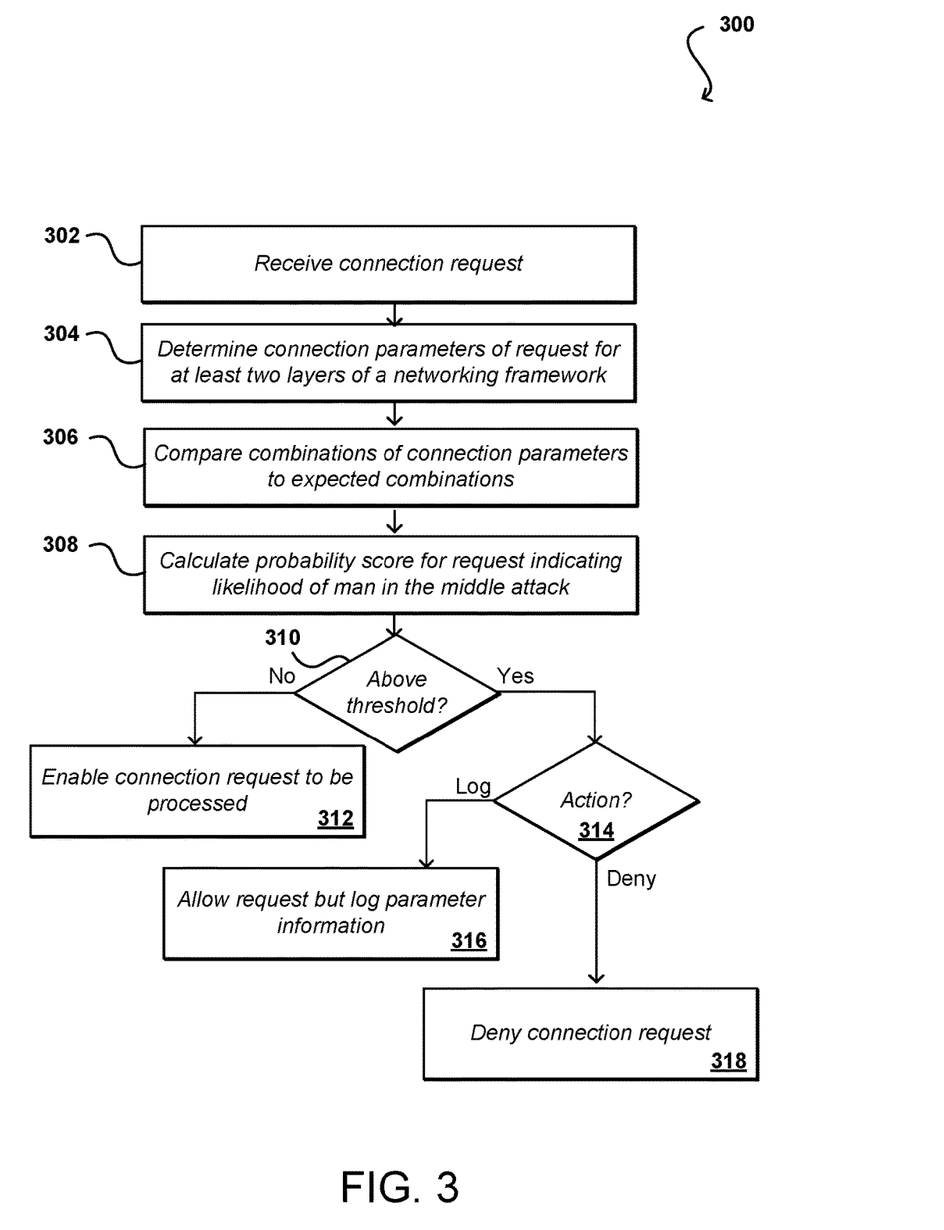
FIG. 3 illustrates an example process for detecting a man in the middle attack that can be utilized in accordance with various embodiments.

FIG. 3 illustrates an example process 300 for detecting an attack or spoof on a connection that can be utilized in accordance with various embodiments. In this example, a connection request is received 302, such as a TLS connection request received from a client device or other such source. Upon receiving the request, the connection parameters can be determined for at least two layers of a networking framework such as OSI. This can include, for example, identifying specific parameters in the Layer 6 (TLS) and Layer 7 (HTTP) metadata, among other such options. The entire set of parameters, or combinations of those parameters, can be compared 306 to expected sets or combinations of parameters for those levels. The expected sets or combinations can be the result of previously received requests and/or patterns detected from analyzing those requests, among other such options. Based at least in part upon the connection parameters, a probability score can be calculated 308 for the request, where the probability value represents the likelihood that a MITM attack, spoofing, or other such intrusion or invalidity is associated with the connection. As mentioned elsewhere herein, this can be a dynamic determination based upon the parameters and a trained model or based upon comparing the request parameters against determined patterns or signatures, among other such options.

Once a probability score is determined for the request, a determination can be made 310 as to whether the probability score is at, above, or below a specified probability threshold. As mentioned, there can be one or more thresholds utilized in various embodiments. In this example, a single probability threshold is used, where any probability value exceeding that threshold can be considered to be suspicious, although other approaches such as values at least meeting the threshold can be used as well. If the probability is determined to be below the threshold, then the connection request can be allowed or enabled 312 to be processed or otherwise handled as per a normal request. If the probability value is determined to be above the threshold, another decision can be made 314 in this example to determine how to handle the suspicious request. If the action is to log the request, then the request can be allowed 316 but the parameter information logged. The request may or may not be processed as a valid request, and may be directed to a specific resource or set of resources, among other such options. A notification may also be sent to a relevant party regarding the potentially suspicious activity. If the action is to deny a suspicious request, then the connection request can be denied 318. Various other options for handling suspicious requests can be used as well as discussed elsewhere herein. Further in at least some embodiments a determination as to whether to log or deny a request can be based at least in part upon the probability score.

As mentioned, simply comparing parameters of a single layer or the inclusion of specific parameters will often not be sufficient, as purveyors of MITM and similar attacks learn and adapt based on success and detection. In many instances, these attackers use the common libraries and generate responses that comply with the various standards. Thus, other factors such as the combinations of parameters across multiple layers, the ordering of those parameters, and other such variations can be important to analyze as well in order to determine more subtle hints as to unintended intrusion. Since some of these slight variations may or may not be significant, it can be desirable to compute probability scores based on the most recent information, and to update and learn from information as it is obtained. A useful approach to this problem is to use computer learning or artificial intelligence to learn from the information and keep an up to date model or set of signatures that can used to determine how likely it is that a request is valid or invalid based on the most recently available data. Approaches can utilize any appropriate type of machine learning, such as may include decision tree learning, neural networks, deep learning, Bayesian networks, and the like.

Figure 4:
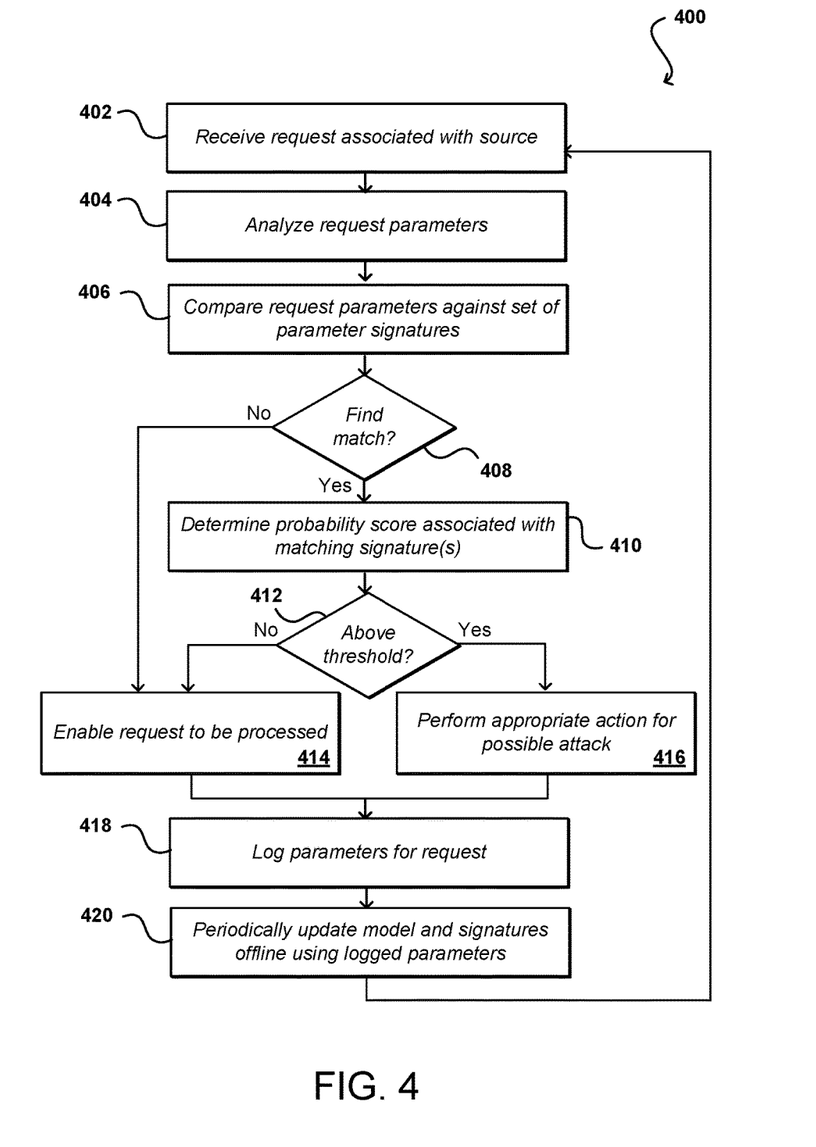
FIG. 4 illustrates an example process for detecting an intrusion using signatures from an offline training process that can be utilized in accordance with various embodiments.

FIG. 4 illustrates another example process 400 for predicting the probability of a connection request being invalid that can be utilized in accordance with various embodiments. In this example, a request is received 402 that is associated with a specific source. As discussed herein, the source could be the actual sender of the request, or the request could have been sent by a MITM component or other entity sending a message that purports to be from that sender. The request parameters can be analyzed 404, such as by analyzing parameters at multiple layers of a communication protocol used to transmit the message. The request parameters can be compared 406 against a set of parameter signatures determined for this type of request. In this example, the signatures are determined using an offline machine learning and/or model training process wherein the most recently received data, here corresponding to request parameters, is used to update the model and/or signatures to reflect any changes represented in the recently received data. These can include signatures for valid, invalid, or suspicious types of requests based upon parameter combinations, among other options discussed herein. Also as mentioned, each signature can have an associated probability score, or other such value, determined and updated through the offline training process.

A determination can be made 408 as to whether a matching signature was located for the request parameters. In some embodiments the signature must be an exact match, having the same parameters at different levels in the same orderings, etc., while in other embodiments signatures or patterns with similar patterns, features, or combinations may be considered partial matches, among other such options. If no match is found then the request can be treated as a new or unknown type of request, and in this example can be enabled 414 to be processed. Information for the request can be logged and analyzed to attempt to match future such request. In other embodiments, however, an appropriate action could instead be taken for a possible attack corresponding to an unknown request pattern. Such an action can include, for example, allowing the request but logging the data or generating a notification of suspicious activity, among other such options. If, however, the probability score is determined 408 to match at least one signature, then a probability score can be determined 410 based at least in part upon an associated probability score for each matching signature. If only a single matching signature is determined, then the probability score for the request can be the probability score for the matching signature for an exact match or can be based upon the probability score for the signature using a similarity of the match (i.e., number of different or out of order parameters, which parameters are different, etc.). If multiple partially matching signatures are located, an overall probability score can be determined based on the probability scores for the matching signatures and the relative similarities. There can also be different weightings applied, as a match for a valid signature may count more or less than a match for an invalid signature, among other such options.

The determined probability score can be compared against at least one probability threshold to determine 412 whether the score (meets or) exceeds a probability threshold in this example. If the probability score is below the threshold, then the request can be determined to likely be valid and can be enabled 414 to be processed as a valid request. If the probability score is above the threshold, then the request can be determined to likely be an invalid request, or at least be a suspicious request, and an appropriate action can be performed 416. As mentioned, there can be different thresholds in some embodiments and the actions taken can correspond to the threshold(s) exceeded by the probability score. In other embodiments the value of the probability threshold might change based upon factors such as a type of customer, type of request, current workload, type of campaign, associated revenue at stake, and the like. The action taken also can depend at least in part upon some embodiments upon which threshold(s) the probability value exceeds. For example, if the probability value exceeds an attack threshold of 90% probability then the request might be denied. If the probability value instead exceeds only a suspicious threshold of 60%, then the request might be allowed but data logged for analysis, among other such options.

Along with performing the appropriate action for the determined probability score, the parameters for the request can be logged 418 or otherwise stored at least temporarily for offline analysis. At an appropriate time or interval, such as once a day or during off peak hours, the logged data can be analyzed and a probability model updated 420 and/or set of new/updated signatures generated for use in determining the probability values for subsequently received requests. The new signatures or model can then be made available to the various detection modules for use in probability determinations. The updates can be propagated asynchronously in most cases, as the existing probability determinations will still cover most cases if the signatures are updated sufficiently regularly. If there is a significant new threat signature detected, however, a different propagation process can be used to ensure that all detection modules get the updates as quickly as possible. In some embodiments the signatures can be stored to a single location from which the detection modules can obtain them, such that the modules will always have access to the most recent signatures.

Figure 5:
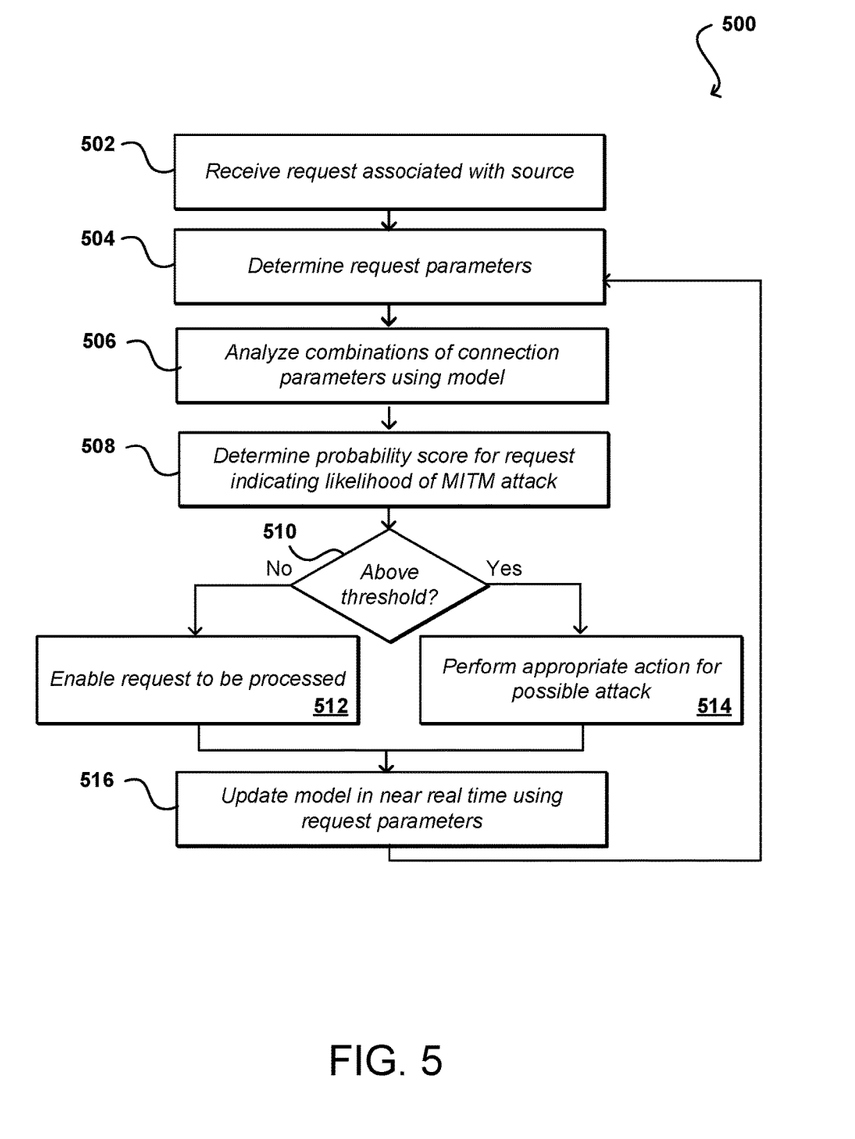
FIG. 5 illustrates an example process for detecting an intrusion and updating an intrusion detection model in near real time that can be utilized in accordance with various embodiments.

FIG. 5 illustrates another example process 500 for detecting suspicious requests that can be utilized in accordance with various embodiments. As with the process 400 of FIG. 4, in this example a request is again received 502 that is associated with a source, and the appropriate request parameters are determined 504 from the message. In this example, however, the process does not rely upon signatures calculated as part of an offline process but instead relies upon dynamic, near real time decisions being made based upon the parameters of the request. Accordingly, the set of parameters, or various combinations of parameters at various layers, can be analyzed 506 using the current probability model. The various parameters can be analyzed using the model and a probability score dynamically determined 508 using the model, where the probability score is indicative of a likelihood of the request corresponding to a MITM attack or other suspicious activity. As discussed previously, the probability score can be compared against at least one probability threshold, and if is determined 510 that the probability value does not exceed the threshold then the request can be enabled 512 to be processed as a valid request. If the probability score is determined to be above at least one threshold, then an appropriate action can be performed 514 for the suspicious request. As mentioned, the number of thresholds, threshold values, and actions taken can vary in different embodiments and situations. In this example, the model will also be updated 516 in near real-time in an online process using the parameters from the request. It typically will be the case that the action is taken first (or request processed) before updating the model to assure reasonable latency, but the steps can be performed concurrently in at least some embodiments. While this process may be more resource intensive than the process of FIG. 4, this process ensures that the most recent threats are identified and that new valid devices or configurations are identified as quickly as possible. The request can be concurrently classified and used to update the knowledge base for subsequent requests.

Figure 6:
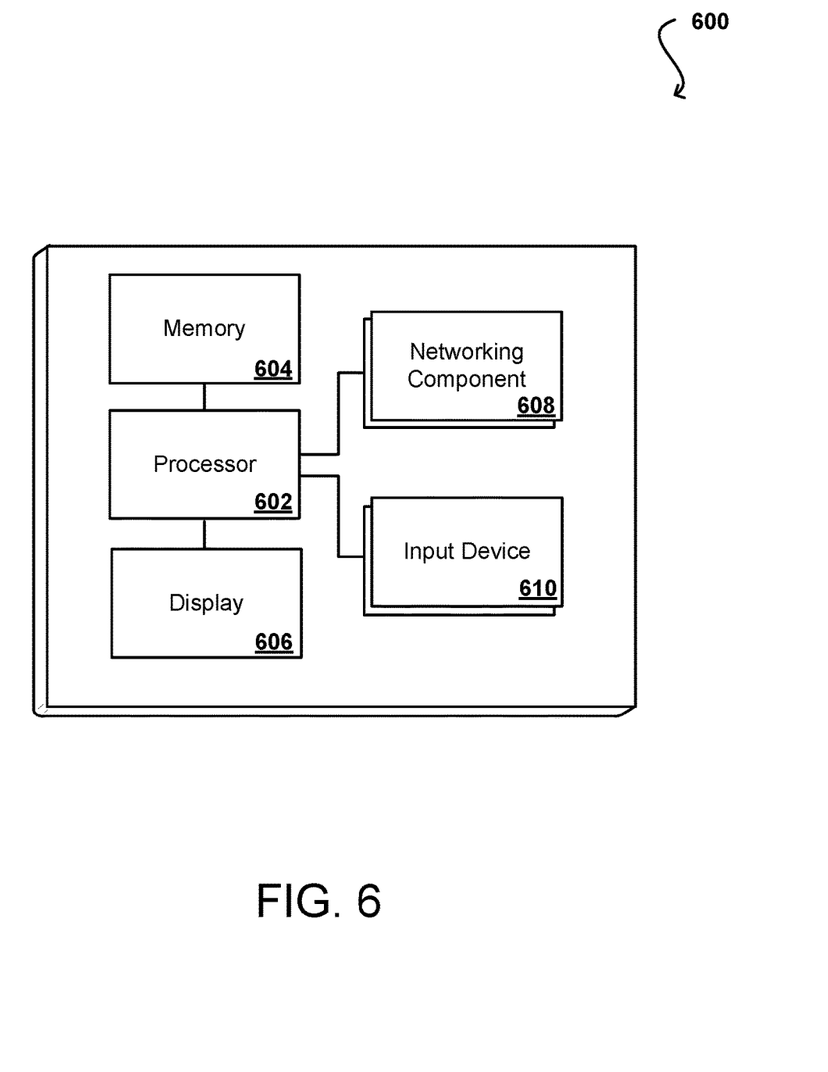
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, to a resource provider environment, a request for a connection to a resource;
   determining a set of connection parameters for the request, the connection parameters selected from at least two layers of a networking framework;
   analyzing the set of connection parameters, prior to establishing the connection to the resource, to determine connection parameter data corresponding to at least one combination of at least a subset of the set of connection parameters;
   comparing the connection parameter data to a set of connection parameter signatures, each connection parameter signature corresponding to a previously determined combination and ordering of connection parameters having a determined probability of corresponding to a man-in-the-middle attack on a respective connection;
   determining one or more matching signatures, of the set of connection parameter signatures, corresponding to the connection parameter data;
   calculating, for the request, a request probability value based at least in part upon the respective probabilities of the one or more matching signatures;
   comparing the request probability value to a probability threshold; and
   performing at least one determined action in response to the request probability value exceeding the probability threshold.

2. The computer-implemented method of claim 1, wherein the networking framework corresponds to the Open System Interconnection model, the further comprising:
   determining a pair of layers of the networking framework from which to select the set of connection parameters, the pair of layers including two layers selected from network layer 3, transport layer 4, session layer 5, presentation layer 6, or application layer 7.

3. The computer-implemented method of claim 1, wherein the set of connection parameter signatures include signatures for at least one of valid connections or connections determined to correspond to suspicious connections, and further comprising:
   calculating the request probability value using a weighted average of the probabilities for the one or more matching signatures.

4. The computer-implemented method of claim 1, further comprising:
   selecting the at least one determined action to perform for the request, the at least one determined action included at least one of denying the request, terminating the connection, directing the request to a limited environment, logging information for the request, providing only a partial response for the request, blocking content associated with the request, or withholding compensation associated with the request.

5. A computer-implemented method, comprising:
   determining, for a connection request, a set of connection parameters of the connection request, the set of connection parameters selected from at least two layers of a networking framework;
   analyzing a selection of at least a subset of the set of connection parameters to determine a probability score for the connection request prior to establishing the connection, the probability score indicating a likelihood that an aspect of the connection request has been compromised;

determining that the probability score exceeds a probability threshold; and
performing a specified action for the connection request.

6. The computer-implemented method of claim 5, wherein the networking framework corresponds to the Open System Interconnection model, and further comprising:
determining a pair of layers of the networking framework from which to select the set of connection parameters, the pair of layers including two layers selected from network layer 3, transport layer 4, session layer 5, presentation layer 6, or application layer 7.

7. The computer-implemented method of claim 5, wherein the set of connection parameters is a valid set according to the networking framework.

8. The computer-implemented method of claim 5, further comprising:
selecting at least one of a combination or an ordering of the selection of connection parameters for the connection request; and
analyzing the at least one of the combination or the ordering of the selection using a trained probability model to generate the probability score.

9. The computer-implemented method of claim 8, further comprising:
updating, in response to determining the probability score, the trained probability model based at least in part upon the probability score or the at least one of the combination or the ordering.

10. The computer-implemented method of claim 5, further comprising:
selecting at least one of a combination or an ordering of the selection of connection parameters for the connection request;
comparing the at least one of the combination or the ordering to a set of connection parameter signatures, each connection parameter signature corresponding to at least one of a previously determined combination or ordering of connection parameters having a determined probability of corresponding to a compromised connection request;
determining one or more matching signatures, of the set of connection parameter signatures, corresponding to the at least one of the combination or the ordering; and
calculating, for the connection request, the probability score based at least in part upon the respective probabilities of the one or more matching signatures.

11. The computer-implemented method of claim 10, further comprising:
calculating the probability score using a weighted average of the probabilities for the one or more matching signatures.

12. The computer-implemented method of claim 10, further comprising:
logging first request information for the connection request, the request information including at least one of the probability score, the combination, or the ordering;
subsequently aggregating the first request information with other request information logged for other connection requests; and
generating a new set of connection parameter signatures based at least in part upon the set of connection parameter signatures and using the aggregated first and other request information.

13. The computer-implemented method of claim 5, further comprising:
receiving a second connection request;
determining that a second probability score for the second connection request exceeds a second probability threshold; and
performing a second action for the second connection request.

14. The computer-implemented method of claim 13, further comprising:
selecting at least one of the second action or the at least one determined action from at least one of request denial, connection termination, directing to a limited environment, logging information, providing only a partial response, blocking associated content, or withholding associated compensation.

15. A non-transitory computer-readable storage medium storing instructions that, when executed by the at least one processor of a computer system, cause the computer system to:
determine, for a connection request, a set of connection parameters of the connection request, the set of connection parameters selected from at least two layers of a networking framework;
analyze a selection of at least a subset of the set of connection parameters to determine a probability score for the connection request prior to establishing the connection, the probability score indicating a likelihood that an aspect of the connection request has been compromised;
determine that the probability score exceeds a probability threshold; and
perform a specified action for the connection request.

16. The non-transitory computer-readable storage medium of claim 15, wherein the networking framework corresponds to the Open System Interconnection model, and wherein the instructions when executed further cause the computer system to:
determine a pair of layers of the networking framework from which to select the set of connection parameters, the pair of layers including two layers selected from network layer 3, transport layer 4, session layer 5, presentation layer 6, or application layer 7.

17. The non-transitory computer-readable storage medium of claim 15, wherein the instructions when executed further cause the computer system to:
select at least one of a combination or an ordering of the selection of connection parameters for the connection request; and
analyze the at least one of the combination or the ordering of the selection using a trained probability model to generate the probability score.

18. The non-transitory computer-readable storage medium of claim 17, wherein the instructions when executed further cause the computer system to:
update, in response to determining the probability score, the trained probability model based at least in part upon the probability score or the at least one of the combination or the ordering.

19. The non-transitory computer-readable storage medium of claim 15, wherein the instructions when executed further cause the computer system to:
select at least one of a combination or an ordering of the selection of connection parameters for the connection request;
compare the at least one of the combination or the ordering to a set of connection parameter signatures, each connection parameter signature corresponding to at least one of a previously determined combination or ordering of connection parameters having a determined probability of corresponding to a compromised connection request;

determine one or more matching signatures, of the set of connection parameter signatures, corresponding to the at least one of the combination or the ordering; and calculate, for the connection request, the probability score based at least in part upon the respective probabilities of the one or more matching signatures.

20. The non-transitory computer-readable storage medium of claim 19, wherein the instructions when executed further cause the computer system to:

log first request information for the connection request, the request information including at least one of the probability score, the combination, or the ordering;

subsequently aggregate the first request information with other request information logged for other connection requests; and generate a new set of connection parameter signatures based at least in part upon the set of connection parameter signatures and using the aggregated first and other request information.

\* \* \* \* \*